US012596399B2

(12) United States Patent
    Cloyd et al.

(10) Patent No.: US 12,596,399 B2
(45) Date of Patent: Apr. 7, 2026

(54) CASES FOR ELECTRONIC DEVICES

(71) Applicant: Apple Inc., Cupertino, CA (US)

(72) Inventors: Bryan A Cloyd, San Francisco, CA (US); Mary S Poletti, Woodside, CA (US); Nicholas R Trincia, San Francisco, CA (US); Benjamin A Stevenson, Oakland, CA (US); Tsung-Wen Su, Tainan (TW); Jack Pickup, Shenzhen (CN); Jessica Wang, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 315 days.

(21) Appl. No.: 18/355,231

(22) Filed: Jul. 19, 2023

(65) Prior Publication Data

US 2024/0094771 A1     Mar. 21, 2024

Related U.S. Application Data

(60) Provisional application No. 63/408,022, filed on Sep. 19, 2022.

(51) Int. Cl.
    *G06F 1/16*          (2006.01)
    *G02B 27/01*         (2006.01)

(52) U.S. Cl.
    CPC ....... *G06F 1/1628* (2013.01); *G02B 27/0176* (2013.01)

(58) Field of Classification Search
    CPC .............. G02B 27/0176; A45C 11/003; A45C 13/1069; A45C 11/002; A45C 11/00
    See application file for complete search history.

(56) References Cited

U.S. PATENT DOCUMENTS

| | | | | |
|---|---|---|---|---|
| 2,203,402 A | * | 6/1940 | Bausch .................. | A45C 11/04 206/6 |
| 7,545,634 B2 | | 6/2009 | Simonian et al. | |
| 8,789,689 B1 | * | 7/2014 | Wong .................... | A45C 11/04 206/6 |

(Continued)

FOREIGN PATENT DOCUMENTS

| | | |
|---|---|---|
| CN | 209300368 U | 8/2019 |
| CN | 110934403 A | 3/2020 |

(Continued)

*Primary Examiner* — Sagar Shrestha
*Assistant Examiner* — Peter Krim
(74) *Attorney, Agent, or Firm* — Treyz Law Group, P.C.; Tianyi He

(57)            ABSTRACT

A case for an electronic device such as a head-mounted device may have a main housing portion that separates an interior region from a surrounding exterior region. The main housing portion may have an opening through which the head-mounted device is received into the interior region. Flexible protruding portions of the main housing portion may form a flexible tab and a flexible flap. To make size adjustments to the interior region, the flexible tab may slide within an opening in a cover. The cover may be configured to move between an open position in which the opening is uncovered and a closed position in which the head-mounted device is enclosed within the interior region by the main housing portion and the cover. Deformable protrusions in the case may be used to seal openings in the head-mounted device when the device is in the interior region.

20 Claims, 10 Drawing Sheets

(56)                    References Cited

U.S. PATENT DOCUMENTS

| | | | |
|---|---|---|---|
| 8,960,430 B2 | 2/2015 | Roach et al. | |
| 9,742,208 B2 | 8/2017 | Stratton et al. | |
| 10,863,060 B2 | 12/2020 | Kokonaski et al. | |
| 11,172,101 B1 | 11/2021 | Boozer et al. | |
| 11,404,890 B1 | 8/2022 | Gu | |
| 2002/0170147 A1 | 11/2002 | Heller | |
| 2010/0089778 A1* | 4/2010 | Park | A45C 7/0095 |
| | | | 206/320 |
| 2011/0315589 A1* | 12/2011 | Thomas | A45C 13/02 |
| | | | 206/521 |
| 2013/0248412 A1* | 9/2013 | Olsson | G06F 1/189 |
| | | | 206/316.1 |
| 2016/0021999 A1* | 1/2016 | Harada | A45C 11/04 |
| | | | 206/5 |
| 2018/0263344 A1 | 9/2018 | Seminara | |
| 2020/0353118 A1* | 11/2020 | Lake | G01N 21/80 |
| 2020/0383441 A1* | 12/2020 | Kan | A45C 13/02 |
| 2022/0218083 A1* | 7/2022 | Wright | A45C 13/005 |

FOREIGN PATENT DOCUMENTS

| | | | |
|---|---|---|---|
| EP | 3939467 A1 | 1/2022 | |
| JP | 2018011282 A | 1/2018 | |

* cited by examiner

CASES FOR ELECTRONIC DEVICES

This application claims the benefit of provisional patent application No. 63/408,022, filed Sep. 19, 2022, which is hereby incorporated by reference herein in its entirety.

FIELD

This relates generally to enclosures and, more particularly, to cases for electronic devices.

BACKGROUND

Electronic devices may be damaged if dropped onto a hard surface or otherwise subjected to excessive force. Cases may be used to protect electronic devices when not in use. Storing an electronic device within a case may help protect the device from damage due to drop events and may help prevent scratches and other wear.

SUMMARY

A case for an electronic device such as a head-mounted device may have a main housing portion. A cover may be used to overlap an opening in the main housing portion, thereby enclosing an interior region of the case and separating the interior region from a surrounding exterior region.

Flexible protruding portions of the main housing portion may form a flexible tab and a flexible flap. The cover may be slidably coupled to the main housing portion using the flexible tab. The flexible tab may form a hinge that allows the cover to move between an open position in which the opening in the main housing portion is uncovered and a closed position in which the cover overlaps the opening. In the closed position, the head-mounted device is enclosed within the interior region by the main housing portion and the cover.

The main housing portion may have a flexible flap that is configured to fold over the cover when the cover is in the closed position. Magnets may be provided in the cover, the flap, and the tab to hold these structures together and thereby retain the electronic device within the interior region.

To make size adjustments to the interior region, the flexible tab may slide within a slot or other opening in the cover. A window in the tab may allow interior region size adjustment indicators such as cavity size numbers to be viewed. The size adjustment indicators may be viewed as the flexible tab slides back and forth within the opening. This provides a user of the case with information on the current selected size of the case. After the cover has been slid along the flexible tab to adjust the size of the interior region, magnets in the tab and cover may attract each other to resist further sliding of the cover along the tab.

Deformable protrusions in the case may be used to seal openings in the head-mounted device when the device is in the interior region. The deformable protrusions may be formed from a soft material such as foam on interior surfaces of the main housing portion. Deformable protrusions such as foam protrusions may also be formed on the cover and may be configured to press against the head-mounted device when the head-mounted device is in the interior region.

DETAILED DESCRIPTION

Figure 1:
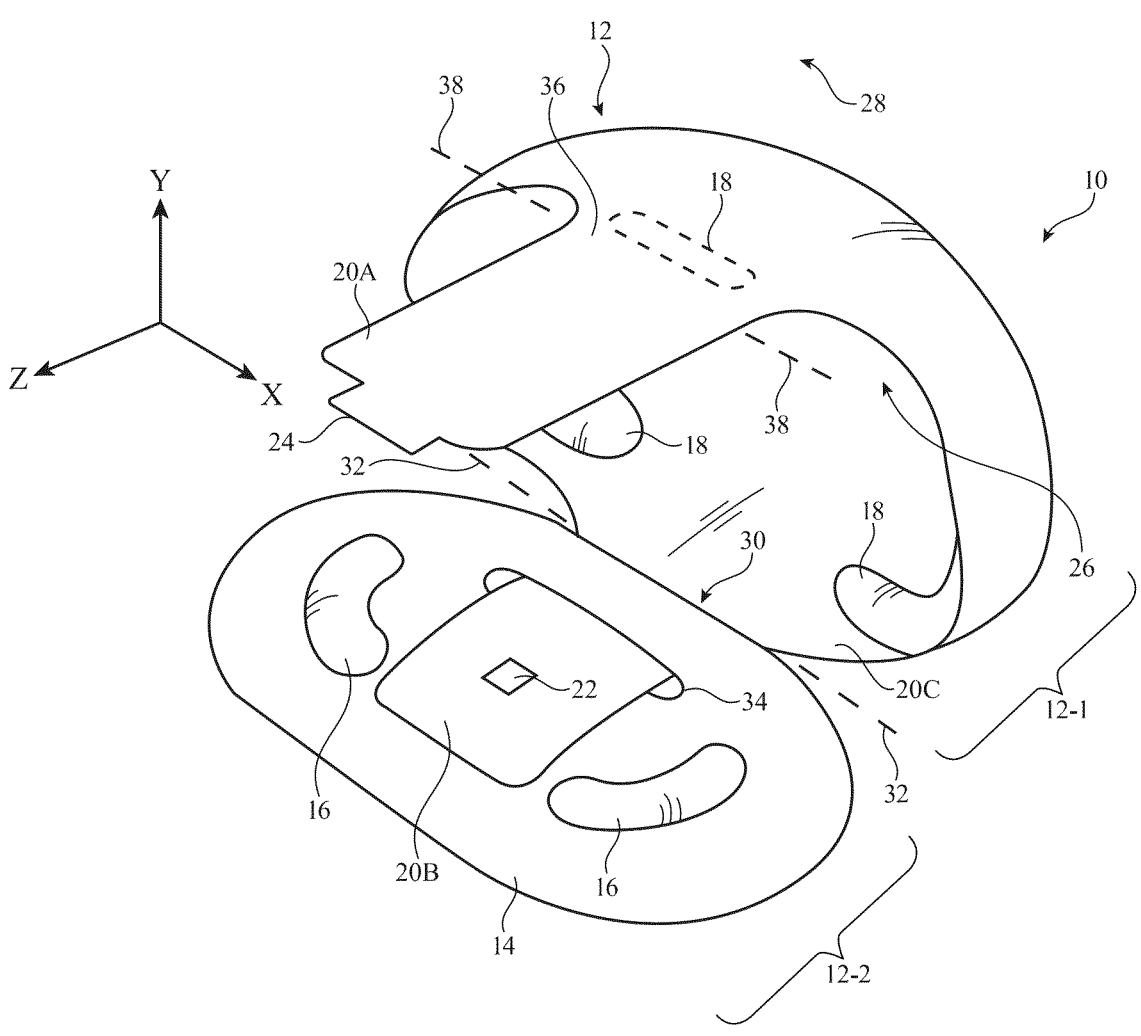
FIG. 1 is a perspective view of an illustrative case in an open position in accordance with an embodiment.

FIG. 1 is a perspective view of an illustrative electronic device case. Case 10, which may sometimes be referred to as a cover, enclosure, protective case, removable case, carrying case, etc., may have housing walls that form housing 12. The walls of housing 12 separate an interior region within case 10 from the exterior region surrounding case 10. The interior of case 10 may be shaped and sized to receive and protect an electronic device such as a head-mounted device, camera, cellular telephone, computer, and/or other electronic equipment. Illustrative configurations in which case 10 is a protective case for a head-mounted device may sometimes be described herein as an example. In general, any suitable electronic device may be stored within case 10.

Housing 12 may have a front portion such as portion 12-1 (sometimes referred to as a main portion or main housing portion) and a rear portion such as portion 12-2 (sometimes referred to as a cover, housing cover portion, etc.). Portion 12-1 may include shell 20C and structures that protrude from shell 20C such as flap 20A and tab 20B. Flexible protrusions 18 (sometimes referred to as deformable protrusions or deformable sealing protrusions) may be provided on shell 20C. Protrusions 18 may be formed from a soft pliable (deformable) material such as foam to help hold a device within case 10 and to help prevent particle ingress into openings in the device (e.g., by temporarily sealing these openings). Portion 12-2 may include cover 14. Flexible protrusions 16 (e.g., foam protrusions or other pliable and deformable protrusions which may sometimes be referred to as alignment protrusions or deformable alignment protrusions) may be formed on cover 14 and may help align and hold the head-mounted device in place in case 10 when case 10 is closed.

Cover 14 may have an opening such as slot 34 through which tab 20B passes. Tab 20B and flap 20A may be formed from elastomeric polymer and/or other flexible materials. Hinge region 30 of tab 20B (which may be formed from a locally softer material and/or a locally thinned material) is preferably sufficiently flexible to allow tab 20B to serve as a hinge that bends about bend axis 32. This allows rear portion 12-2 to be folded upwards to overlap and cover the opening formed at the rear of shell 20C, thereby enclosing interior region 26. Hinge region 36 of flap 20A is preferably sufficiently flexible to allow flap 20A to be folded downwards about hinge axis 38 to cover rear portion 12-2. Flap 20A may have a pull tab such as pull tab 24 that is formed from a material that allows pull tab 24 to be gripped by the fingers of a user (e.g., when the user desires to move flap 20A upwards to open case 10).

When portion 12-2 has been folded upwards and flap 20A has been folded downwards over portion 12-2, magnets in cover 14, tab 20B, and flap 20A may help hold flap 20A and cover 12-2 in place. The magnets of tab 20B and cover 14 may attract each other to hold tab 20B in place (e.g., so that tab 20B does not slip within slot 34). The magnets of cover 14 and flap 20A may attract each other to hold flap 20A over cover 14 and thereby help hold cover 14 in its closed position over the opening in portion 12-1. When case 10 is closed, the walls of housing 12 separate interior region 26 from exterior region 28 surrounding case 10. A head-mounted device may be stored in region 26 to help protect the device from damage.

The head-mounted devices that are stored in interior region 26 may have different sizes (e.g., these devices may have different sizes to accommodate different users). It may therefore be desirable to allow the size of interior region 26 (e.g., the length of region 26 along the Z dimension of FIG. 1) to be adjusted. In the example of FIG. 1, this may be accomplished by sliding tab 20B within slot 34. A single tab 20B and single slot 34 are shown in the example of FIG. 1. If desired, there may be two or more tabs 20B, two or more slots 34, and/or one, two, or more than two flaps 20A. These structures may be formed as integral portions of portion 12-1 or may be formed using one or more separate structures that are attached to the main housing portion of case 10 using slots, hook-and-loop fastener material, magnets, snaps, and/ or other attachment mechanisms. Tab 20B may have a window such as window 22. Window 22 may overlap a column of internal-region size numbers or other cavity size markings (sometimes referred to as interior-region size indicators) on cover 14, so that a selected one of the numbers is visible when a user adjusts the size of case 10 by moving tab 20 through slot 34. Arrangements in which size indicators are formed on tab 20B in addition to or instead of on cover 14 may also be used.

Figure 2:
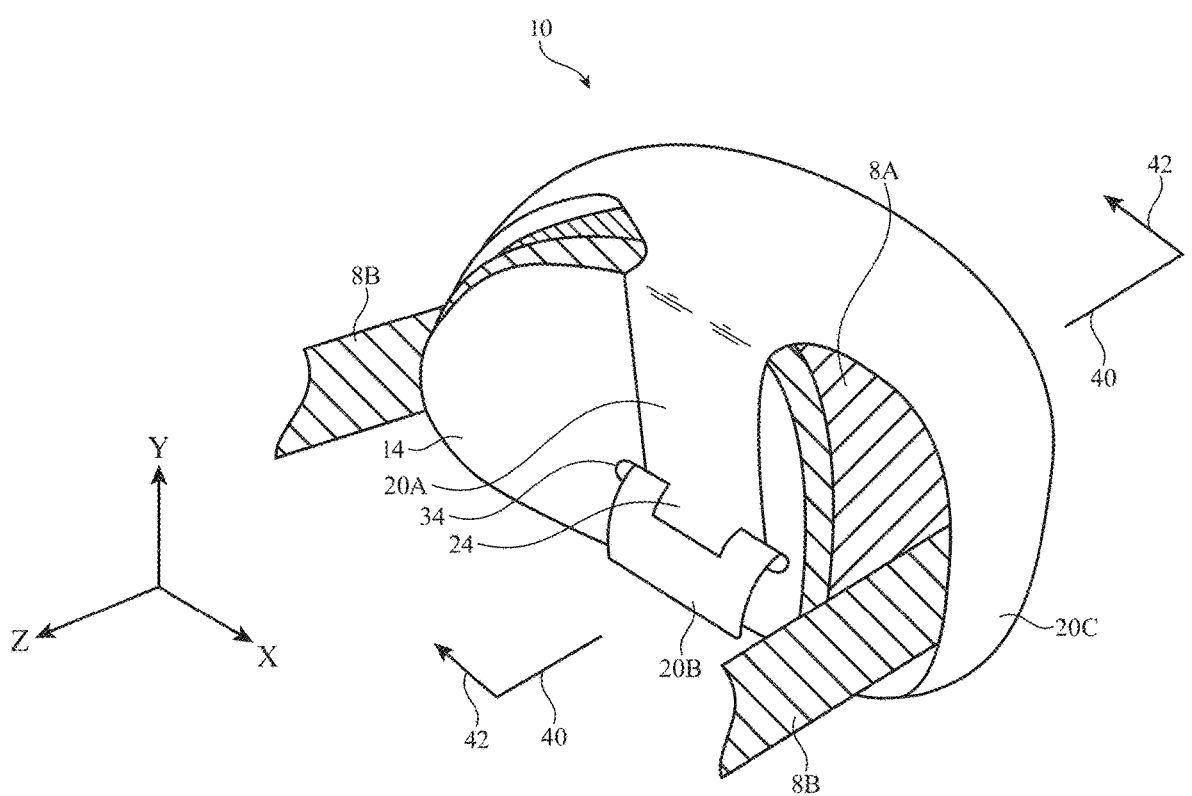
FIG. 2 is a perspective view of the illustrative case of FIG. 2 in a closed position after the case has received a head-mounted device in accordance with an embodiment.

FIG. 2 is a perspective view of case 10 of FIG. 1 in an illustrative configuration in which a head-mounted device has been stored in interior region 26. As shown in FIG. 2, head-mounted device 8A may have straps 8B. There may be gaps formed between the edges of flap 20A and the opposing edges of shell 20C through which straps 8B may protrude while other portions of device 8A are received within the interior of case 10.

Figure 3:
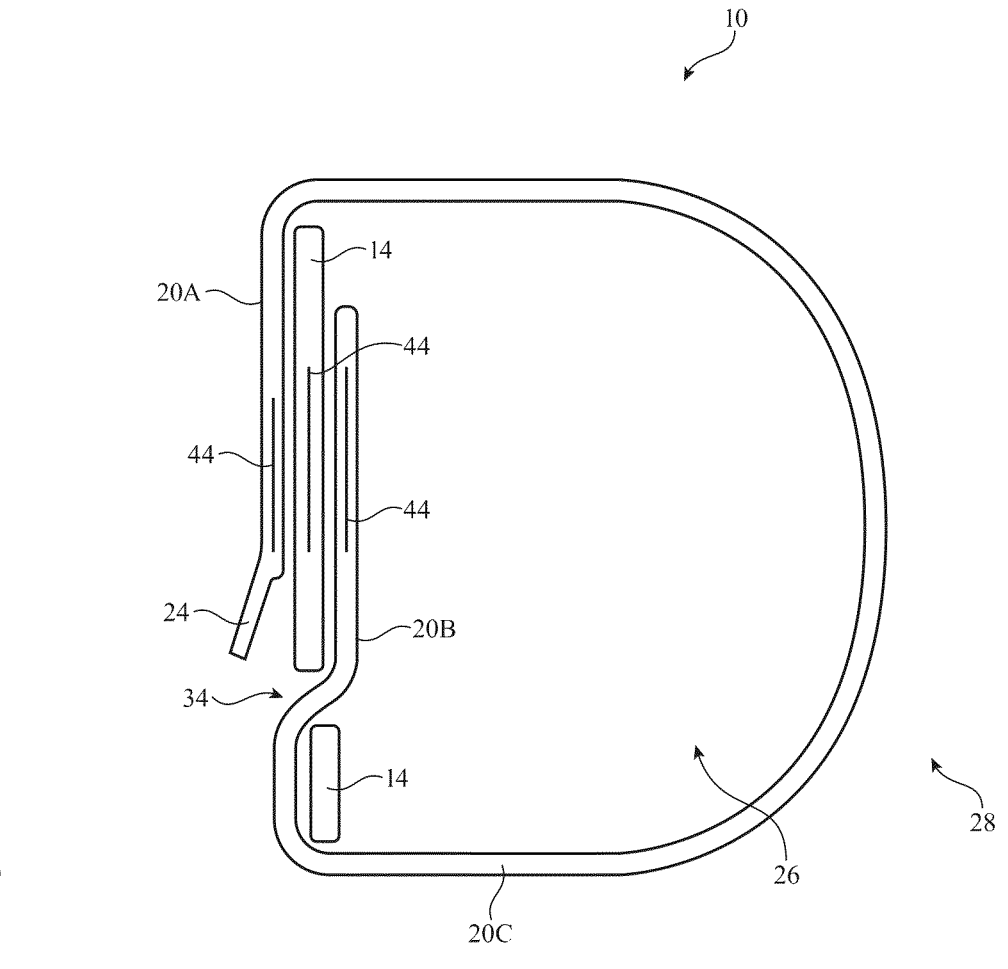
FIG. 3 is a cross-sectional side view of an illustrative case in accordance with an embodiment.

FIG. 3 is a cross-sectional side view of case 10 of FIG. 2 taken along line 40 of FIG. 2 and viewed in direction 42. As shown in FIG. 3, magnets 44 may be embedded within flap 20A, tab 20B, and cover 14 so that flap 20A, tab 20B, and cover 14 are held in place in a desired configuration when case 10 is closed. If desired, other temporary attachment mechanisms may be used (e.g., clasps formed from snaps, stretchable elastic cords, hook-and-loop fasteners, and/or other attachment mechanisms).

Figures 4A, 4B:
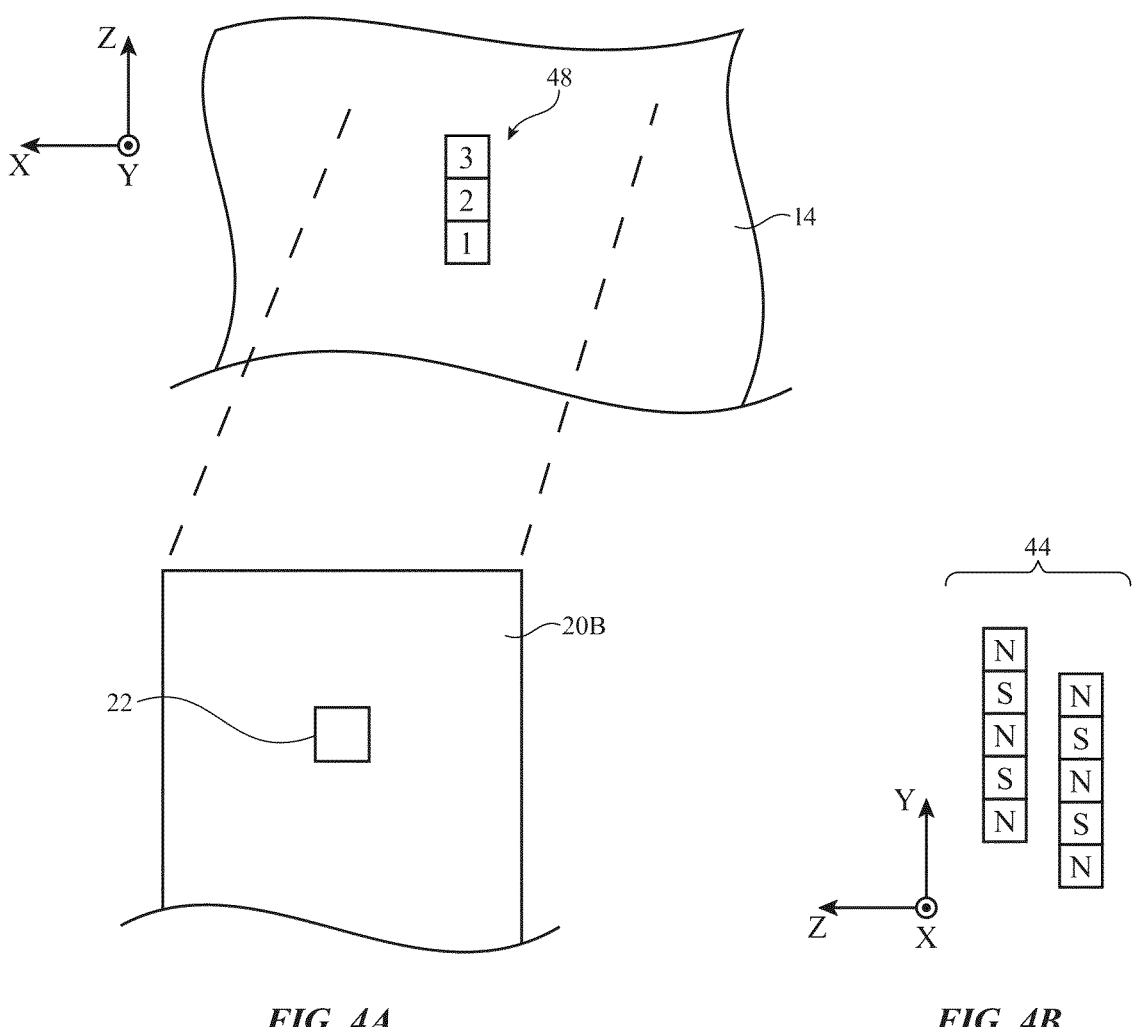
FIG. 4A is a diagram of a portion of an illustrative adjustable-size case in accordance with an embodiment.
FIG. 4B is a side view of an illustrative pair of magnets in accordance with an embodiment.

As described in connection with FIG. 2, a user of case 10 may adjust the size of case 10 by moving tab 20B back and forth through slot 34. FIG. 4A is a diagram showing how cover 14 may be provided with a column of interior-region size indicator markings (e.g., size numbers) such as size indicators 48. In the orientation of FIG. 4A, cover 14 is open and lying flat in the XZ plane as shown in FIG. 1. When tab 20B is magnetically attached to cover 14, the currently selected size for case 10 may be determined by viewing which of the cavity size numbers is visible through window 22 in tab 20B. Other types of size indicators may be used, if desired (e.g., tab 20B and adjacent portions of cover 14 may contain arrows, numbers, icons, and/or other size indicators that may be used as reference markings that visually indicate the current selected size for case 10). The use of an opening in tab 20B such as window 22 that is lined up with a corresponding cavity size indicator on cover 14 is illustrative. Size indicators may be oriented so that the top of the size indicators points in the +Z direction or the-Z direction (as examples).

FIG. 4B shows how magnets 44 may have alternating north-south poles (N, S), so that when a pair of magnets 44 are attracted to each other, only certain discrete orientations (shifts along the Y axis of FIG. 4B) will be allowed (e.g., orientations in which the N pole on a first of magnets 44 is adjacent to and aligned with the S pole on a second of magnets 44). In the orientation of FIG. 4B, cover 14 is in the closed position of FIG. 2 so that magnets 44 lie in the XY plane. By forming magnets 44 so that the poles of magnets 44 are sufficiently close to each other, the user may be provided with a satisfactorily fine level of position adjustment. This allows the location of tab 20B within slot 34 to be accurately adjusted to accommodate a desired range of head-mounted device sizes. There may be two or more, three or more, four or more, or five or more possible size adjustments for interior region 26 (as examples).

Figure 5:
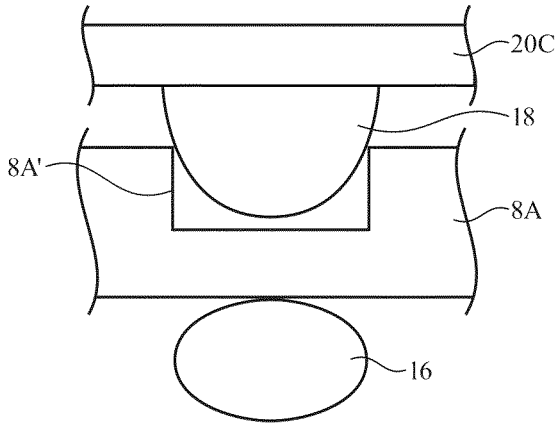
FIG. 5 is a cross-sectional view of a portion of an illustrative case having foam protrusions that are configured to engage air vents and/or other portions of an electronic device when the electronic device is stored in the case in accordance with an embodiment.
Figure 5:
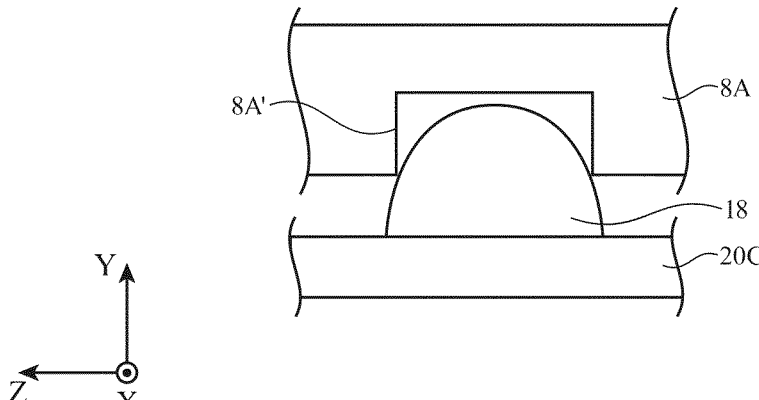

FIG. 5 is a cross-sectional side view of case 10 showing how protrusions 18 on shell 20C may protrude into openings 8A' in head-mounted device 8A, thereby sealing these openings to prevent particle intrusion while also helping to hold device 8A in place within case 10. Openings 8A' may correspond to air cooling ports (e.g., fan intake and exhaust ports). Protrusions 18 may be formed from foam or other flexible material. When it is desired to remove device 8A, the foam of protrusions 16 and 18 may deform so that protrusions 18 can be withdrawn from openings 8A'.

Figure 6:
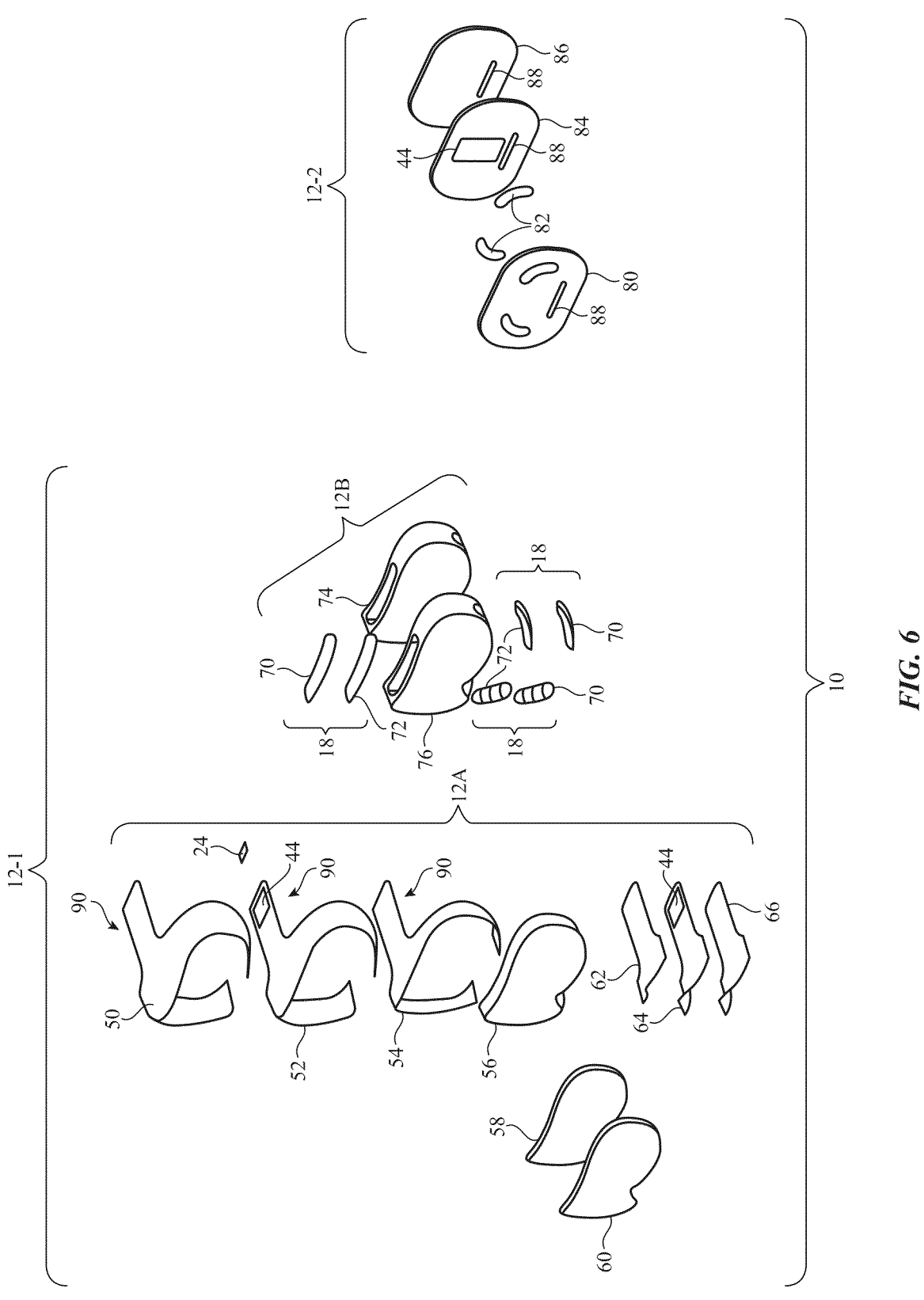
FIG. 6 is an exploded perspective view of an illustrative case in accordance with an embodiment.

FIG. 6 is an exploded perspective view of case 10 showing illustrative structures that may be used in forming case 10. In the example of FIG. 6, portion 12-1 is formed from an outer covering portion such as main body 12A and an interior portion such as foam module 12B that is covered by main body 12A.

Main body 12A may include an elastomeric polymer structure such as structure 50 (e.g., a cosmetic cover layer formed from polyurethane), woven webbing for forming pull tab 24, an elastomeric polymer mid-layer such as acrylonitrile butadiene rubber (NBR) layer 52 in which one of magnets 44 is embedded, a soft liner layer such as microfiber layer 54, rigid structural members such as inner rigid shell 56 (e.g., a polycarbonate shell structure) and outer rigid shell 58 (e.g., a polycarbonate shell structure), a thin cosmetic elastomeric cover layer such as layer 60 (e.g., a multilayer film of a first polyurethane with a thin skin of a second polyurethane), a soft tab liner such as microfiber liner layer 62, an elastomeric structural member for tab 20B such as elastomeric layer 64 (e.g., an acrylonitrile butadiene rubber layer) in which another of magnets 44 is embedded, and a cosmetic elastomeric tab cover layer such as polyurethane layer 66. Protruding portions 90 of structure 50, layer 52, and layer 54 may form flexible flap 20A. Layer 60, layer 62, and layer 64 may form tab 20B. Flap 20A and tab 20B

(which may sometimes be referred to as protrusions, protruding housing portions, flexible elongated members, tabs, flaps, tongues, etc.) may, if desired, be formed from unitary set of structures or may, as shown in FIG. 6 be formed from two separate sets of structures in portion 12-1.

Module 12B may be inserted within body 12A to provide an interior lining for body 12A. Module 12B may have deformable members such as foam structures 70 that are covered with soft layers of material such as microfiber layers 72 to form protrusions 18 and may have a microfiber liner layer 74 on the inner side of foam layer 76. These structures may help provide a soft interior for protecting device 8A when device 8A is stored in case 10.

Portion 12-2 may include an elastomeric layer such as layer 86 (e.g., a cosmetic polyurethane layer), a structural elastomeric layer in which one of magnets 44 has been embedded such as layer 84 (e.g., an acrylonitrile butadiene rubber layer), deformable members such as foam 82, and a soft covering layer such as microfiber layer 80. Foam 82 may be covered with portions of layer 80 and/or other microfiber to form protrusions 16. Layers 86, 84, and 80 may have aligned slots 88 that form slot 34 in cover 14 (FIG. 1).

Figure 7:
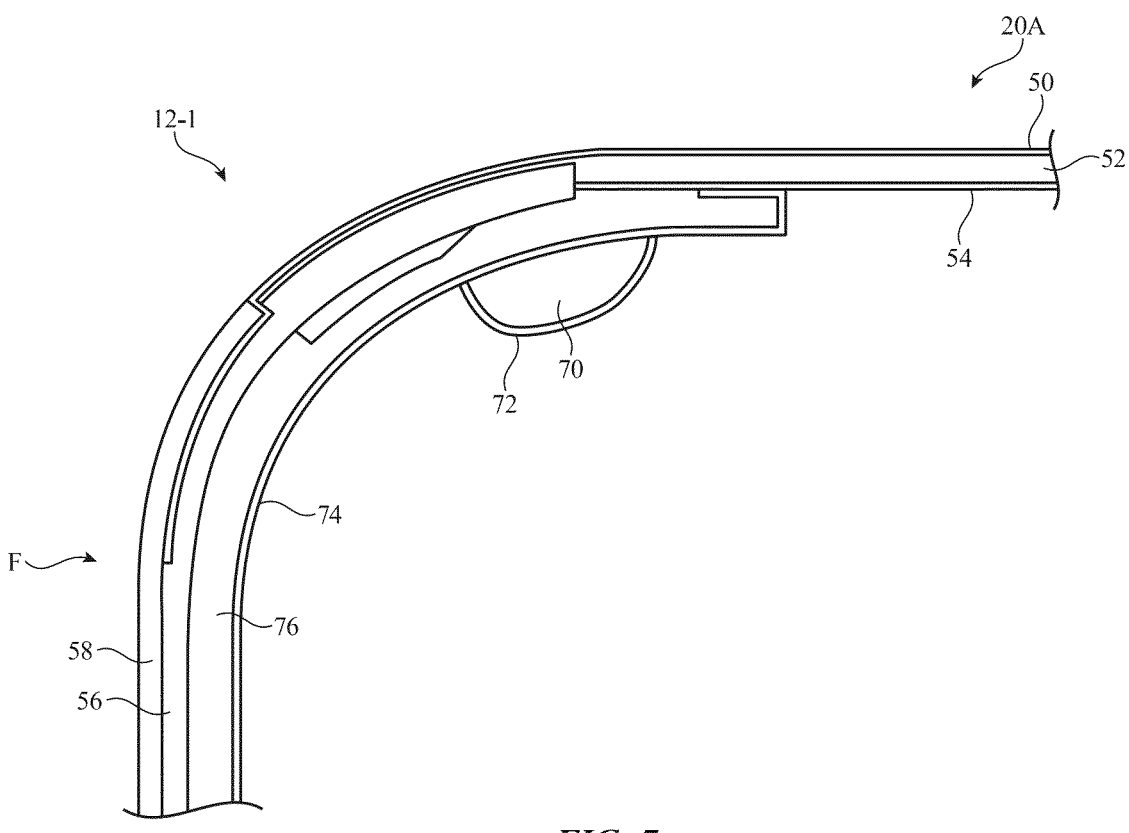
FIG. 7 is a cross-sectional side view of a portion of an illustrative case in accordance with an embodiment.

A cross-sectional side view of a portion of case 10 showing how layers of material may be attached together (e.g., using adhesive) to form the walls of the housing of case 10 is shown in FIG. 7. As shown in FIG. 7, layer 50 may extend to front F of portion 12-1 and may be sandwiched between polycarbonate shells 56 and 58.

Figure 8:
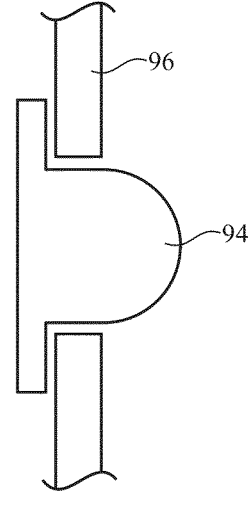
FIGS. 8, 9, and 10 are cross-sectional side views of illustrative foam protrusions in accordance with embodiments.
Figure 9:
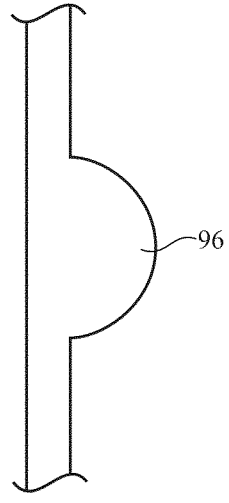
Figure 10:
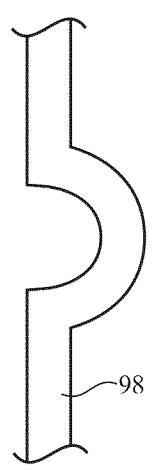

In the example of FIG. 7, foam 70 and foam 76 are formed from separate structures and may be made of the same foam material or different foam materials. These foam structures may have the same stiffness values or may have different respective stiffness values. Additional illustrative arrangements for forming deformable housing protrusions (e.g., structures for protrusions 16 and/or 18) from foam are shown in FIGS. 8, 9, and 10. In the example of FIG. 8, a foam protrusion is formed from first foam structure 94 (e.g., a member with a T-shaped cross-sectional profile), which has a portion that protrudes through an opening in second foam structure 96 (e.g., a housing liner foam layer that supports the protrusion). In the example of FIG. 9, a foam protrusion is formed from a protruding portion of foam layer 96 (e.g., the foam material of the protrusion and the housing liner layer that supports the protrusion are integrated). In the example of FIG. 10, a hollow foam protrusion is formed in housing liner layer 98 (e.g., to enhance the deformability of the protrusion). Other types of arrangements for forming deformable protrusions may be used, if desired.

Figure 11:
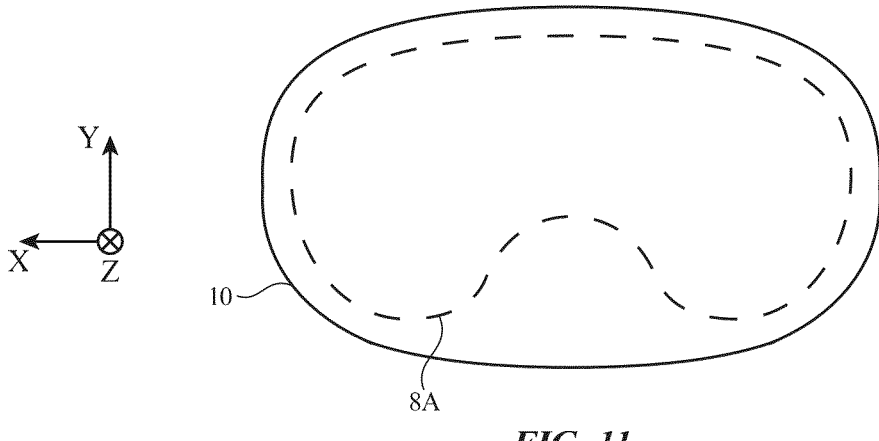
FIGS. 11 and 12 are front views of illustrative cases in accordance with embodiments.
Figure 12:
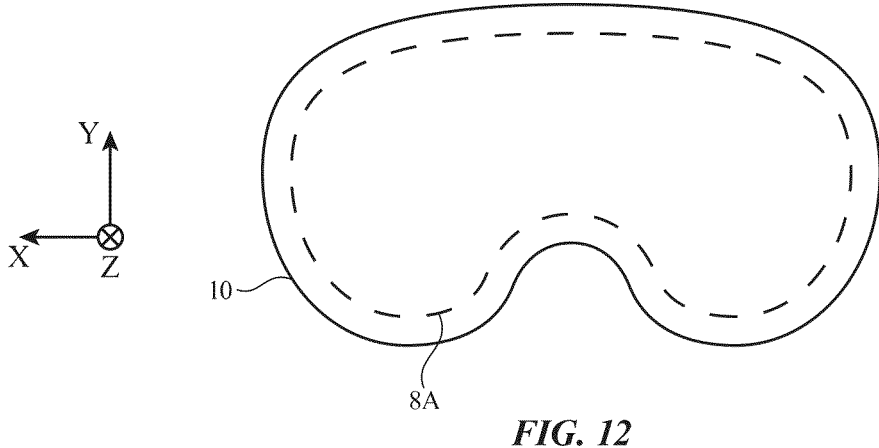

FIGS. 11 and 12 are front views of illustrative cases. Case 10 of FIG. 11 has an oval outline and is sized to receive device 8A within its interior. Case 10 of FIG. 12 has a recessed portion such as nose bridge portion NB, which is aligned with a corresponding recessed nose bridge portion in device 8A, thereby accommodating device 8A for storage. The shape of case 10 of FIG. 12 may enhance the appearance of case 10 and may help to indicate to a user which type of device is stored in case 10.

Figure 13:
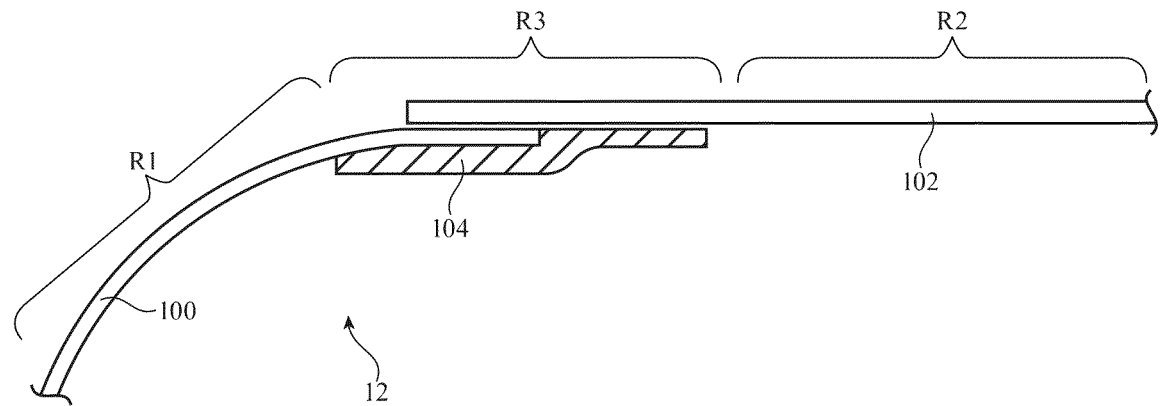
FIG. 13 is a cross-sectional side view of a portion of an illustrative case in accordance with an embodiment.

In the example of FIG. 6, body 12A includes stiff structures such as shells 56 and 58, whereas tab 20B and flap 20A are formed from soft flexible elastomeric material (e.g., rubber). To help prevent an abrupt transition between the relatively high stiffness of the shell of portion 12-1 and the tab/flap structures of portion 12-1, a stiffness transition bridge may be formed. This type of arrangement is shown in FIG. 13. As shown in FIG. 13, first housing portion 100 (e.g., a portion of housing 12 including polycarbonate structures such as shells 58 and 60 of FIG. 6) may have a first stiffness (e.g., a relatively high stiffness that makes portion 100 rigid), whereas second housing portion 102 (e.g., a structure such as flap 20A or tab 20B that has flexible polymer layers) may have a second stiffness (e.g., a relatively low stiffness that makes portion 102 flexible). To reduce the abruptness of the transition between the higher stiffness of portion 100 and the lower stiffness of portion 102, a stiffness transition structure such as polymer layer 104 (e.g., a layer of flexible polymer with an intermediate stiffness or other stiffness value such as a layer of polyethylene terephthalate) may be attached to portions 100 and 102 (e.g., with adhesive) as shown in FIG. 13. Layer 104 may be a strip of polymer that extends into the page of FIG. 13 and runs along the seam joining portions 100 and 102. When portion 104 is present, housing 12 will have a first stiffness in region R1, a second (lower) stiffness in region R2, and will have an intermediate stiffness in region R3 (where stiffness transition layer 104 is present). This arrangement helps smooth the stiffness transition between the rigid and flexible portions of housing 12 and may therefore enhance the feel case 10 during handling by a user.

The above-described technology may involve the gathering and use of information such as sensor information. The present disclosure contemplates that in some instances, data may be gathered that includes personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, username, password, biometric information, or any other identifying or personal information.

The present disclosure recognizes that the use of such personal information, in the present technology, can be used to the benefit of users. For example, the personal information data can be used to deliver targeted content that is of greater interest to the user. Accordingly, use of such personal information data enables users to calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the United States, collection of or access to certain health data may be governed by federal and/or state laws, such as the Health Insurance Portability and Accountability Act (HIPAA), whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In another example, users can select not to provide certain types of user data. In yet another example, users can select to limit the length of time user-specific data is maintained. In addition to providing "opt in" and "opt out" options, the present disclosure contemplates providing notifications relating to the access or use of personal information. For instance, a user may be notified upon downloading an application ("app") that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of information that may include personal information data to implement one or more various disclosed embodiments, the present disclosure also contemplates that the various embodiments can also be implemented without the need for accessing personal information data. That is, the various embodiments of the present technology are not rendered inoperable due to the lack of all or a portion of such personal information data.

The foregoing is merely illustrative and various modifications can be made to the described embodiments. The foregoing embodiments may be implemented individually or in any combination.

What is claimed is:

1. A case for storing a head-mounted device, comprising:
a main portion that separates an exterior region surrounding the main portion from an interior region that is configured to receive the head-mounted device; and
a cover portion configured to cover an opening in the interior region, wherein the cover portion is slidably coupled to a flexible protruding portion of the main portion to make size adjustments to the interior region, wherein the flexible protruding portion is configured to bend about a bend axis to move the cover portion between a first position in which the opening is not overlapped by the cover portion so that the interior region is open to the exterior region and a second position in which the cover portion overlaps the opening, wherein the flexible protruding portion is configured to form a tab that slides through an opening in the cover portion to make the size adjustments to the interior region, and wherein the main portion further comprises a flexible flap configured to fold over the cover portion when the cover portion overlaps the opening in the interior region.

2. The case defined in claim 1 wherein the cover portion has an interior-region size indicator and wherein the flexible protruding portion has a window through which the interior-region size indicator is visible.

3. The case defined in claim 1 wherein the tab containing contains an elastomeric layer.

4. The case defined in claim 3 further comprising a magnet embedded in the elastomeric layer.

5. The case defined in claim 1 further comprising deformable protrusions on an interior surface of the main portion, wherein the deformable protrusions are configured to be received in openings in the head-mounted device when the head-mounted device is in the interior region.

6. The case defined in claim 1 further comprising a first magnet in the tab, a second magnet in the cover portion, and a third magnet in the flexible flap, wherein the first and second magnets hold the tab to the cover portion and wherein the third and second magnets hold the flexible flap to the cover portion.

7. A case for a head-mounted device, the case comprising:
a housing configured to define an interior region in which the head-mounted device is received for storage; and
deformable protrusions on the housing that are configured to be received within openings in the head-mounted device when the head-mounted device is stored in the interior region, wherein the openings comprise head-mounted device air cooling ports and wherein the deformable protrusions are configured to seal the head-mounted device air cooling ports when the head-mounted device is in the interior region.

8. The case defined in claim 7 wherein the deformable protrusions comprise foam protrusions.

9. The case defined in claim 8 further comprising a microfiber layer covering the foam protrusions.

10. The case defined in claim 9 wherein the housing is configured to form an opening to the interior region through which the head-mounted device is received, the housing comprising a cover that is coupled to the head-mounted device by a hinge and that is configured to overlap the opening to the interior region when the head-mounted device is in the interior region.

11. The case defined in claim 10 further comprising an additional foam protrusion on the cover that is configured to press against the head-mounted device when the cover is overlapping the opening to the interior region.

12. The case defined in claim 11 further comprising a flap formed from a flexible protruding portion of the housing that is configured to fold over the cover, wherein there are gaps between edges of the flap and respective adjacent portions of the housing through which straps in the head-mounted device protrude when the cover is overlapping the opening to the interior region and the flap is folded over the cover.

13. The case defined in claim 7 wherein the deformable protrusions comprise foam protrusions and wherein the head-mounted device air cooling ports are sealed by the foam protrusions when the head-mounted device is in the interior region.

14. The case defined in claim 7 wherein the deformable protrusions comprise flexible material.

15. An adjustable-size case configured to store a head-mounted device, the adjustable-size case comprising:

a first portion having a flexible tab and having an opening;

a second portion configured to move between an open position in which the opening is uncovered to receive the head-mounted device and a closed position in which the second portion overlaps the opening and closes off an interior region of the first portion in which the head-mounted device is stored, wherein the second portion has a slot through which the flexible tab slides to make a size adjustment to the interior region;

an interior-region size indicator on the second portion; and a window in the flexible tab through which the interior-region size indicator is visible.

16. The adjustable-size case defined in claim 15 further comprising magnets in the flexible tab and the second portion that are configured to resist sliding of the flexible tab through the slot after the size adjustment has been made.

17. The adjustable-size case defined in claim 15 wherein the first portion comprises a recessed nose-bridge portion.

18. The adjustable-size case defined in claim 15 wherein the first portion has a shell characterized by a first stiffness value, wherein the first portion has a flexible flap with a second stiffness value that is less than the first stiffness value, and wherein the flexible flap is configured to fold over the second portion when the head-mounted device is stored in the interior region, the first portion further comprising a strip of polymer that overlaps part of the shell and part of the flexible flap to create a transition region with a third stiffness value that is between the first and second stiffness values.

19. The adjustable-size case defined in claim 15 further comprising a magnet in the flexible tab.

20. The adjustable-size case defined in claim 19 wherein the flexible tab comprises an elastomeric layer and wherein the magnet is embedded in the elastomeric layer.

* * * * *